United States Patent
Kojima

(10) Patent No.: US 8,293,844 B2
(45) Date of Patent: Oct. 23, 2012

(54) RUBBER COMPOSITION FOR CAP TREAD AND STUDLESS TIRE

(75) Inventor: Ryoji Kojima, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 9 days.

(21) Appl. No.: 12/891,342

(22) Filed: Sep. 27, 2010

(65) Prior Publication Data

US 2011/0077359 A1   Mar. 31, 2011

(30) Foreign Application Priority Data

Sep. 29, 2009   (JP) ................................ 2009-225333

(51) Int. Cl.
*C08L 9/00*   (2006.01)
(52) U.S. Cl. ...................................... 525/236
(58) Field of Classification Search .................. 525/236
See application file for complete search history.

(56) References Cited

U.S. PATENT DOCUMENTS

| | | | | |
|---|---|---|---|---|
| 5,396,940 | A * | 3/1995 | Segatta et al. | 152/209.1 |
| 5,489,628 | A * | 2/1996 | Sandstrom | 523/213 |
| 7,803,866 | B2 * | 9/2010 | Hirabayashi | 524/528 |

FOREIGN PATENT DOCUMENTS

| | | |
|---|---|---|
| JP | 62-27442 A | 2/1987 |
| JP | 63-97644 A | 4/1988 |
| JP | 1-165635 A | 6/1989 |
| JP | 3-126737 A | 5/1991 |
| JP | 4-136050 A | 5/1992 |
| JP | 8-134267 A | 5/1996 |
| JP | 2002-47378 A | 2/2002 |
| JP | 2006-188571 A | 7/2006 |
| JP | 2006-348222 A | 12/2006 |
| JP | 2008-303332 A | 12/2008 |
| JP | 2009-114251 A | 5/2009 |
| JP | 2009-114252 A | 5/2009 |
| JP | 2011-12161 A | 1/2011 |
| WO | 2011-26368 A | 2/2011 |

* cited by examiner

*Primary Examiner* — Nathan M Nutter
(74) *Attorney, Agent, or Firm* — Birch, Stewart, Kolasch & Birch, LLP

(57) ABSTRACT

The present invention has its object to provide a rubber composition for a cap tread capable of improving the performance on snow and ice and the wet performance in good balance, and a studless tire having a cap tread produced from the rubber composition. The present invention relates to a rubber composition for a cap tread, including a rubber component that contains epoxidized natural rubber and butadiene rubber, the rubber component containing 1 to 85% by mass of the epoxidized natural rubber, based on 100% by mass of the rubber component, and the epoxidized natural rubber having an epoxidation degree of 1.5 to 40 mol %.

4 Claims, No Drawings

RUBBER COMPOSITION FOR CAP TREAD AND STUDLESS TIRE

TECHNICAL FIELD

The present invention relates to a rubber composition for a cap tread, and a studless tire (winter tire) produced from the same.

BACKGROUND ART

Vehicles have been equipped with spike tires or with tires with chains for driving snow- and ice-covered roads. This, however, causes environmental problems such as powder dust pollution, and therefore studless tires have been developed as the replacement for the spike tires and the tires with chains for driving snow- and ice-covered roads. The studless tires have been improved in their materials and designs for driving the snow-covered roads having rougher surfaces compared to the surfaces of usual roads. For example, studies have been made to develop a rubber composition that contains diene rubber having excellent low-temperature properties.

Along with the recent global warming, vehicles with studless tires are driven increasingly on paved roads. For driving on various road surfaces including the paved road surfaces, improvement of both dry performance and wet performance of a tire is demanded. In particular, improvement of the wet performance of a tire is strongly demanded as it affects the safety of driving. On the other hand, since further improvement of the performance on snow and ice of a tire is demanded, the rubber hardness of a cap tread tends to be set so that Tg (glass transition temperature) is low in order to achieve better low-temperature properties. However, it is difficult for the conventional art to provide a rubber composition with both snow performance and wet performance.

In general, in order to improve the wet performance of a rubber composition, for example, the blending amount of fillers such as carbon black and silica is increased, or alternatively, the hysteresis loss of the rubber composition is increased by using a rubber component having a high Tg. However, the above methods decrease the flexibility of the rubber composition at low temperatures (i.e. the hardness of the rubber composition is increased), resulting in deteriorated performance on snow and ice.

Patent Document 1 discloses a rubber composition containing epoxidized polyisoprene, which can enhance abrasion resistance, etc. Patent Document 2 discloses a combination use of a rubber component having a high affinity for white fillers and a rubber component having a low affinity for white fillers in order to unevenly distribute the white fillers in the rubber composition. Here, epoxidized natural rubber is used as one constituent of the rubber component. Patent Document 3 discloses a rubber composition containing epoxidized natural rubber and a fatty acid metal salt, which exerts good heat aging resistance.

However, in Patent Documents 1 to 3, the blending amount of epoxidized natural rubber and its epoxidation degree are not specifically studied. Further, those methods do not sufficiently improve the performance on snow and ice and the wet performance in good balance.

Patent Document 1: JP 2006-188571 A
Patent Document 2: JP 2006-348222 A
Patent Document 3: JP 2008-303332 A

SUMMARY OF THE INVENTION

An object of the present invention is to provide a rubber composition for a cap tread capable of improving the performance on snow and ice and the wet performance in good balance so that the above problems can be solved, and a studless tire having a cap tread produced from the rubber composition.

The present invention relates to a rubber composition for a cap tread, comprising a rubber component that contains epoxidized natural rubber and butadiene rubber, the rubber component containing 1 to 85% by mass of the epoxidized natural rubber, based on 100% by mass of the rubber component, and the epoxidized natural rubber having an epoxidation degree of 1.5 to 40 mol %.

In the rubber composition, the rubber component desirably contains 20% by mass or more of the butadiene rubber, based on 100% by mass of the rubber component.

The present invention also relates to a studless tire comprising a cap tread produced from the above rubber composition.

According to the present invention, the rubber composition for a cap tread contains a predetermined amount of an epoxidized natural rubber having a specific degree of epoxidation, and contains butadiene rubber. Therefore, unlike the conventional methods in which the blending amount of fillers such as carbon black and silica is increased, it is possible to improve wet performance without significantly increasing the hardness of the rubber composition at low temperatures. As a result, a studless tire having a cap tread produced from the rubber composition can achieve high levels of the performance on snow and ice and the wet performance in good balance.

BEST MODE FOR CARRYING OUT THE INVENTION

The rubber composition of the present invention contains a predetermined amount of an epoxidized natural rubber (ENR) having a specific degree of epoxidation, and contains butadiene rubber (BR).

The ENR is not specifically limited, and commercially available epoxidized natural rubber may be used, or it may be prepared by epoxidizing natural rubber (NR). The process of epoxidizing natural rubber is not specifically limited. Examples thereof may include the chlorohydrin process, the direct oxidation process, the hydrogen peroxide process, the alkyl hydroperoxide process, and the peracid process (disclosed in JP H4-26617 B, JP H2-110182 A, GB 2113692, and the like). Examples of the peracid process include a process in which an organic peracid such as peracetic acid or performic acid is reacted with natural rubber. Adjustment of the amount of an organic peracid and the reaction time enables epoxidized natural rubbers having various degrees of epoxidation.

In the present invention, the epoxation degree refers to the proportion (mol %) of the number of epoxidized double bonds to the total number of double bonds in the rubber before epoxidized. In the present invention, the epoxidation degree can be determined by the method described in the EXAMPLES mentioned later.

The natural rubber to be epoxidized is not specifically limited, and examples thereof include commonly-used ones in the tire industry, such as SIR20, RSS#3, TSR20, deproteinized natural rubber (DPNR), and highly purified natural rubber (HPNR).

The epoxidation degree of the ENR is 1.5 mol % or more, desirably 2 mol % or more, more desirably 3 mol % or more, and further desirably 5 mol % or more. When the epoxidation degree is less than 1.5 mol %, it may not be possible to sufficiently improve the performance on snow and ice and the wet performance in good balance. The epoxidation degree of the ENR is 40 mol % or less, desirably 35 mol % or less, more desirably 25 mol % or less, and further desirably 15 mol % or less. When the epoxidation degree is more than 40 mol %, the performance on snow and ice tends to be deteriorated, though the wet performance is improved.

The amount of the ENR in 100% by mass of the rubber component is 1% by mass or more, desirably 5% by mass or more, and more desirably 10% by mass or more. When the amount is less than 1% by mass, it may not be possible to sufficiently improve the performance on snow and ice and the wet performance in good balance. The amount of the ENR in 100% by mass of the rubber component is 85% by mass or less, desirably 60% by mass or less, more desirably 50% by mass or less, and further desirably 40% by mass or less. When the amount is more than 85% by mass, the performance on snow and ice tends to be deteriorated, though the wet performance is improved.

The rubber composition of the present invention contains BR. The BR is not specifically limited, and commonly-used ones in the tire industry may be used. BRs having a cis content of 90% by mass or more are desirably used as they secure sufficient low-temperature properties.

The BR desirably has a mooney viscosity ($ML_{1+4}$ (100° C.)) of 10 or more, more desirably 20 or more, and further desirably 30 or more. When the mooney viscosity of the BR is less than 10, problems in the production process, such as adhesion to a kneader, may occur. In addition, the dispersibility of filler tends to be lowered. The mooney viscosity of the BR is desirably 120 or less, more desirably 100 or less, and further desirably 80 or less. When the mooney viscosity thereof is more than 120, the rubber composition has a higher mooney viscosity and burning (discoloration) of the rubber composition may occur in extrusion processing.

The molecular weight distribution (Mw/Mn) of the BR is desirably 1.5 or more, more desirably 2.0 or more, and further desirably 2.5 or more. When the molecular weight distribution is less than 1.5, the processability of the rubber composition tends to be deteriorated. The Mw/Mn of the BR is desirably 5.0 or less, more desirably 4.5 or less, and further desirably 4.0 or less. When the Mw/Mn of the BR is more than 5.0, the abrasion resistance of the rubber composition tends to be deteriorated.

In the present invention, the number average molecular weight (Mn) and the weight average molecular weight (Mw) are determined relative to polystyrene standards by a gel permeation chromatograph (GPC) (HLC-8220GPC produced by Tosoh Corporation, detector: differential refractometer, column: TSKGEL SUPERMALTPORE HZ-M produced by Tosoh Corporation).

The amount of the BR in 100% by mass of the rubber component is desirably 20% by mass or more, more desirably 30% by mass or more, and further desirably 35% by mass or more. When the amount is less than 20% by mass, the performance on snow and ice may not be sufficiently improved. The amount of the BR in 100% by mass of the rubber component is desirably 80% by mass or less, more desirably 70% by mass or less, and further desirably 60% by mass or less. When the amount is more than 80% by mass, the processability of the rubber composition tends to be deteriorated.

Examples of the usable rubber component other than ENR and BR include natural rubber (NR), styrene butadiene rubber (SBR), styrene isoprene butadiene rubber (SIBR), ethylene propylene diene rubber (EPDM), chloroprene rubber (CR), acrylonitrile butadiene rubber (NBR), and a halogenated copolymer of isomonoolefin and para-alkyl styrene. Among these, NR is desirably used because both low-temperature properties and breaking strength can be obtained. It is to be noted that the NR is not specifically limited and commonly-used ones in the tire industry may be used.

The amount of the NR in 100% by mass of the rubber component is desirably 5% by mass or more, more desirably 10% by mass or more, and further desirably 15% by mass or more. When the amount is less than 5% by mass, the breaking strength tends to be deteriorated and whitening (blooming, bleeding) is more likely to occur. The amount of the NR in 100% by mass of the rubber component is desirably 80% by mass or less, more desirably 70% by mass or less, and further desirably 60% by mass or less. When the amount is more than 80% by mass, the low-temperature properties necessary for a studless tire may not be secured.

The rubber composition of the present invention may further contain other additives as appropriate, in addition to the aforementioned ingredients. Examples of the additives include fillers such as silica and carbon black, silane coupling agents, oils, tackifiers, antioxidants, antiozonants, age resistors, vulcanization agents, vulcanization accelerators, and vulcanization accelerator aids.

The rubber composition of the present invention desirably contains carbon black. The carbon black that can be used is not specifically limited, and examples thereof include GPF, FEF, HAF, ISAF, and SAF. Blending of carbon black can provide a rubber composition with enhanced reinforcement.

The dibutyl phthalate (DBP) oil absorption of the carbon black is desirably 80 ml/100 g or more, and more desirably 100 ml/100 g or more. When the DBP oil absorption is less than 80 ml/100 g, sufficient reinforcement may not be provided. The DBP oil absorption of the carbon black is desirably 150 ml/100 g or less, and more desirably 130 ml/100 g or less. When the DBP oil absorption is more than 150 ml/100 g, the processability and low-temperature properties of the rubber composition may be deteriorated.

The DBP oil absorption of carbon black is determined in accordance with a measuring method of JIS K6217-4.

The amount of the carbon black is desirably 15 parts by mass or more, and more desirably 30 parts by mass or more, per 100 parts by mass of the rubber component. When the amount is less than 15 parts by mass, sufficient reinforcement may not be provided. The amount of the carbon black is desirably 80 parts by mass or less, and more desirably 70 parts by mass or less, per 100 parts by mass of the rubber component. When the amount is more than 80 parts by mass, the low-temperature properties tend to be deteriorated, and therefore it may not be possible to secure the performance on snow and ice, which is necessary for a studless tire.

The rubber composition of the present invention desirably contains oil. The oil allows the rubber composition to get softer at low temperatures so that the performance on snow and ice, which is necessary for a studless tire, is easily achieved. The oil is not specifically limited, and examples thereof include: process oils such as paraffinic oil, naphthenic oil, and aromatic oil; and vegetable fats and oils such as castor oil, cottonseed oil, linseed oil, rapeseed oil, soybean oil, palm oil, coconut oil, peanut oil, rosin, pine oil, pine tar, tall oil, corn oil, rice oil, sesame oil, olive oil, sunflower oil, palm kernel oil, camellia oil, jojoba oil, macadamia nut oil, safflower oil, and tung oil. Among these, aromatic oil and paraffinic oil are desirably used because they are excellent in softening effect at low temperatures.

The amount of the oil is desirably 10 parts by mass or more, and more desirably 15 parts by mass or more, per 100 parts by mass of the rubber component. When the amount is less than 10 parts by mass, the low-temperature properties tend to be deteriorated. The amount of the oil is desirably 80 parts by mass or less, and more desirably 70 parts by mass or less, per 100 parts by mass of the rubber component. When the amount is more than 80 parts by mass, the mooney viscosity of the rubber composition tends to be lowered, resulting in deteriorated processability of the rubber composition.

The rubber composition of the present invention can be produced by a known method. For example, the rubber composition can be produced by mixing the aforementioned ingredients with a rubber kneader such as an open roll mill, a Banbury mixer, or an internal mixer, and then vulcanizing the resultant mixture.

The rubber composition of the present invention is used for producing a cap tread of a studless tire. The cap tread is a surface part of a tread having a multi-layer structure. In a case where a tread has a two-layer structure comprising a surface layer and an inner layer, the surface layer is a cap tread.

The tread having a multi-layer structure can be produced by laminating rubber composition sheets into a predetermined shape, or by introducing a rubber composition into two or more extruders to form a sheet comprising two or more layers at the head exit of the extruders.

The studless tire of the present invention can be produced through a common method with use of the above rubber composition.

More specifically, an unvulcanized rubber composition prepared by blending the aforementioned ingredients is extruded and processed into a shape of cap tread, and then molded with other tire components in a usual manner on a tire building machine to form an unvulcanized tire. Then, the unvulcanized tire is subjected to heating and pressing in a vulcanizer to obtain the studless tire of the present invention.

Usage of the studless tire of the present invention is not specifically limited, and the studless tire is particularly suitably used for passenger vehicles, trucks and buses.

EXAMPLES

The present invention will be more specifically described based on Examples, but the present invention is not intended to be limited to these Examples.

In the following, the respective chemical agents used in Examples and Comparative Examples are listed.

NR: RSS#3
ENR1: See Preparation Example 1.
ENR2: See Preparation Example 2.
ENR5: See Preparation Example 3.
ENR10: See Preparation Example 4.
ENR25: See Preparation Example 5.
ENR35: See Preparation Example 6.
ENR50: See Preparation Example 7.
BR: BR150B produced by Ube Industries, Ltd. (cis content: 97% by mass, $ML_{1+4}$ (100° C.): 40, viscosity of 5% solution in toluene at 25° C.: 48 cps, Mw/Mn: 3.3)
Carbon black: DIABLACK I produced by Mitsubishi Chemical Corporation (ISAF carbon, average particle size: 23 nm, DBP oil absorption: 114 ml/100 g)
Aromatic oil: Diana Process Oil AH-24 produced by Idemitsu Kosan Co., Ltd.
Stearic Acid: "KIRI" produced by NOF Corporation
Zinc oxide: Zinc oxide #2 produced by MITSUI MINING & SMELTING CO., LTD.
Age resistor: Nocrac 6C produced by OUCHI SHINKO CHEMICAL INDUSTRIAL CO., LTD. (N-phenyl-N'-(1,3-dimethylbutyl)-p-phenylenediamine)
Wax: OZOACE wax produced by Nippon Seiro Co., Ltd.
Sulfur: sulfur powder produced by Tsurumi Chemical Industry Co., Ltd.
Vulcanization accelerator TBBS: NOCCELER NS produced by OUCHI SHINKO CHEMICAL INDUSTRIAL CO., LTD. (N-tert-butyl-2-benzothiazolylsulfenamide)

Preparation Example 1 (Preparation of ENR1)

ENR1 was prepared in the same manner as in Preparation Example 3 below, except that the amount of peracetic acid and the reaction time were changed.

Preparation Example 2 (Preparation of ENR2)

ENR2 was prepared in the same manner as in Preparation Example 3 below, except that the amount of peracetic acid and the reaction time were changed.

Preparation Example 3 (Preparation of ENR5)

An amount of 1500 g of high ammonia-type natural rubber latex (Hytex available from Nomura Trading Co., Ltd.) (solid content: 60%) was introduced into a 5-L container equipped with a stirrer, a dropping funnel, and a condenser. The rubber latex was diluted with 1.5 L of distilled water so that the solid content of the mixture was set to 30%, and the temperature was adjusted to 20° C. An amount of 9 g of a nonionic emulsifier ("EMULGEN 106" produced by Kao Corporation) was added to the mixture with stirring. Then, while pH of the latex was adjusted with 2.8% aqueous ammonia to the range of 5 to 6, 800 g of a peracetic acid solution having a concentration of 2.5 mol/L was slowly added. After the addition, the reaction was carried out at room temperature for five hours. Then, formic acid or methanol was added thereto little by little and only the rubber component was coagulated. The coagulated mass was washed with distilled water several times and dried, whereby ENR5 was prepared.

Preparation Example 4 (Preparation of ENR10)

ENR10 was prepared in the same manner as in Preparation Example 3 mentioned above, except that the amount of peracetic acid and the reaction time were changed.

Preparation Example 5 (Preparation of ENR25)

ENR25 was prepared in the same manner as in Preparation Example 3 mentioned above, except that the amount of peracetic acid and the reaction time were changed.

Preparation Example 6 (Preparation of ENR35)

ENR35 was prepared in the same manner as in Preparation Example 3 mentioned above, except that the amount of peracetic acid and the reaction time were changed.

Preparation Example 7 (Preparation of ENR50)

ENR50 was prepared in the same manner as in Preparation Example 3 mentioned above, except that the amount of peracetic acid and the reaction time were changed.

Each of the ENRs prepared in Preparation Examples 1 to 7 was dissolved in deuterated chloroform, and nuclear magnetic resonance (NMR (JNM-ECA series, produced by JEOL Ltd.)) spectrometric analysis was carried out to obtain integral values h (ppm) of the peak area of carbon-carbon double bond moiety and of the peak area of aliphatic moiety. The epoxidation degree of each ENR was determined from the ratio of the obtained integral values h by using the following formula:

(Epoxidation degree)=3×h(2.69)/(3×h(2.69)+3×h(5.14)+h(0.87))×100.

The obtained epoxidation degree of each ENR is shown below.
ENR1: 1 mol %
ENR2: 2 mol %
ENR5: 5 mol %
ENR10: 10 mol %
ENR25: 25 mol %
ENR35: 35 mol %
ENR50: 50 mol %

Examples 1 to 12 and Comparative Examples 1 to 6

According to the respective formulations shown in Tables 1 and 2, chemical agents other than the sulfur and the vulcanization accelerator were mixed by a Banbury mixer at 150° C. for 5 minutes to provide a mixed mass (process 1). To the resulting mixed mass were added the sulfur and the vulcanization accelerator, and they were mixed by an open roll mill at 80° C. for 3 minutes to provide an unvulcanized rubber composition (process 2). The obtained unvulcanized rubber composition was molded into a cap tread shape, assembled with other tire components, and then vulcanized at 170° C. for 15 minutes. Thus, test studless tires (tire size: 195/65R15) were produced.

The test studless tires were evaluated for the following performances. Tables 1 and 2 show the results thereof.

(Hardness)

With respect to test pieces cut out of the cap treads of the test studless tires, the hardness at −10° C. was measured by a type-A durometer in conformity with JIS K 6253 "Rubber, vulcanized or thermoplastic—Determination of hardness".

(Tg (glass transition temperature))

With respect to test pieces cut out of the cap treads of the test studless tires, the tan δ was measured by a viscoelastic spectrometer VES (produced by Iwamoto Seisakusyo Co., Ltd.) under conditions of a temperature of −100 to 100° C. and a dynamic strain of 0.5%. The peak magnitude thereof was obtained as Tg.

(Wet performance)

The test studless tires were mounted on a FR car made in Japan (2000 cc), and sensory evaluation by a test driver was conducted with respect to the grip performance (grip feeling, brake performance, traction performance) on a wet asphalt road surface. In the sensory evaluation, performance of the studless tire in Comparative Example 1 was evaluated as 100. When the test driver found that performance of the studless tire was obviously improved compared to that in Comparative Example 1, the performance of that studless tire was evaluated as 120. When the test driver found that performance of the studless tire was at a high level that had never been achieved, the performance of that studless tire was evaluated as 140.

(Performance on snow and ice)

The test studless tires were mounted on a FR car made in Japan (2000 cc), and sensory evaluation by a test driver was conducted with respect to the starting, acceleration, and stopping of the car on ice- and snow-covered roads. In the sensory evaluation, performance of the studless tire in Comparative Example 1 was evaluated as 100. When the test driver found that performance of the studless tire was obviously improved compared to that in Comparative Example 1, the performance of that studless tire was evaluated as 120. When the test driver found that performance of the studless tire was at a high level that had never been achieved, the performance of that studless tire was evaluated as 140. The evaluation was carried out at Hokkaido Nayoro test course. The temperature on ice was −6 to −1° C. and the temperature on snow was −10 to −2° C.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Formulation of ingredients (part(s) by mass) | NR | — | — | — | — | — | — | — | — | — | 55 | 30 | 20 |
| | ENR1 | — | — | — | — | — | — | — | — | — | — | — | — |
| | ENR2 | 60 | — | — | — | — | — | — | — | — | — | — | — |
| | ENR5 | — | 60 | — | — | — | — | — | — | — | — | — | — |
| | ENR10 | — | — | 60 | — | — | 10 | 20 | 40 | 80 | 5 | 20 | 40 |
| | ENR25 | — | — | — | 60 | — | — | — | — | — | — | — | — |
| | ENR35 | — | — | — | — | 60 | — | — | — | — | — | — | — |
| | ENR50 | — | — | — | — | — | — | — | — | — | — | — | — |
| | BR | 40 | 40 | 40 | 40 | 40 | 90 | 80 | 60 | 20 | 40 | 40 | 40 |
| | Carbon black | 50 | 50 | 50 | 50 | 50 | 50 | 50 | 50 | 50 | 50 | 50 | 50 |
| | Aromatic oil | 25 | 25 | 25 | 25 | 25 | 25 | 25 | 25 | 25 | 25 | 25 | 25 |
| | Stearic acid | 3 | 3 | 3 | 3 | 3 | 3 | 3 | 3 | 3 | 3 | 3 | 3 |
| | Zinc oxide | 3 | 3 | 3 | 3 | 3 | 3 | 3 | 3 | 3 | 3 | 3 | 3 |
| | Age resistor | 2.0 | 2.0 | 2.0 | 2.0 | 2.0 | 2.0 | 2.0 | 2.0 | 2.0 | 2.0 | 2.0 | 2.0 |
| | Wax | 1 | 1 | 1 | 1 | 1 | 1 | 1 | 1 | 1 | 1 | 1 | 1 |
| | Sulfer | 2.5 | 2.5 | 2.5 | 2.5 | 2.5 | 2.5 | 2.5 | 2.5 | 2.5 | 2.5 | 2.5 | 2.5 |
| | Vulcanization accelerator TBBS | 1.0 | 1.0 | 1.0 | 1.0 | 1.0 | 1.0 | 1.0 | 1.0 | 1.0 | 1.0 | 1.0 | 1.0 |
| Evaluation | Hardness | 45 | 45 | 46 | 47 | 48 | 41 | 42 | 44 | 48 | 45 | 45 | 46 |
| | Tg (° C.) | −56 | −54 | −52 | −50 | −46 | −68 | −66 | −63 | −50 | −58 | −56 | −54 |
| | Wet performance | 102 | 104 | 106 | 108 | 112 | 96 | 97 | 98 | 105 | 102 | 103 | 104 |
| | Performance on snow and ice | 100 | 99 | 99 | 97 | 96 | 112 | 109 | 105 | 98 | 100 | 100 | 99 |

TABLE 2

| | | Comparative Examples | | | | | |
|---|---|---|---|---|---|---|---|
| | | 1 | 2 | 3 | 4 | 5 | 6 |
| Formulation of | NR | 60 | — | — | — | — | 59.5 |
| tion of | ENR1 | — | — | 60 | 90 | — | — |

TABLE 2-continued

|  |  | Comparative Examples | | | | | |
|---|---|---|---|---|---|---|---|
|  |  | 1 | 2 | 3 | 4 | 5 | 6 |
| ingredients (part(s) by mass) | ENR2 | — | — | — | — | — | — |
|  | ENR5 | — | — | — | — | — | — |
|  | ENR10 | — | — | — | — | 90 | 0.5 |
|  | ENR25 | — | — | — | — | — | — |
|  | ENR35 | — | — | — | — | — | — |
|  | ENR50 | — | 60 | — | — | — | — |
|  | BR | 40 | 40 | 40 | 15 | 15 | 40 |
|  | Carbon black | 50 | 50 | 50 | 50 | 50 | 50 |
|  | Aromatic oil | 25 | 25 | 25 | 25 | 25 | 25 |
|  | Stearic acid | 3 | 3 | 3 | 3 | 3 | 3 |
|  | Zinc oxide | 3 | 3 | 3 | 3 | 3 | 3 |
|  | Age resistor | 2.0 | 2.0 | 2.0 | 2.0 | 2.0 | 2.0 |
|  | Wax | 1 | 1 | 1 | 1 | 1 | 1 |
|  | Sulfer | 2.5 | 2.5 | 2.5 | 2.5 | 2.5 | 2.5 |
|  | Vulcanization accelerator TBBS | 1.0 | 1.0 | 1.0 | 1.0 | 1.0 | 1.0 |
| Evaluation | Hardness | 45 | 50 | 45 | 46 | 49 | 45 |
|  | Tg (° C.) | −60 | −42 | −58 | −52 | −46 | −60 |
|  | Wet performance | 100 | 114 | 100 | 102 | 108 | 100 |
|  | Performance on snow and ice | 100 | 89 | 100 | 92 | 86 | 100 |

Tables 1 and 2 showed that, in each of Examples in which the rubber composition contained a predetermined amount of an ENR having an epoxidation degree within a specific range and contained BR, better performance on snow and ice and better wet performance were achieved in good balance, compared to Comparative Example 1. In addition, the hardness thereof at a low temperature (−10° C.) was similar to that of the rubber composition in Comparative Example 1.

On the other hand, in each of Comparative Examples 2 to 4 in which the rubber composition contained an ENR having an epoxidation degree outside the specific range, the performance on snow and ice and the wet performance were not improved or these performances were in poor balance, compared to Comparative Example 1. The same tendency was found in Comparative Examples 5 and 6 in each of which the blending amount of ENR was outside the predetermined range.

The invention claimed is:

1. A winter tire, comprising a cap tread produced from a rubber composition comprising:
   oil; and
   a rubber component that contains epoxidized natural rubber and butadiene rubber, the rubber component containing 1 to 85% by mass of the epoxidized natural rubber and 20% by mass or more of the butadiene rubber based on 100% by mass of the rubber component,
   wherein the epoxidized natural rubber has an epoxidation degree of 1.5 to 40 mol %,
   wherein a Mooney viscosity (ML1+4(100)) of the butadiene rubber is 10 to 120, and
   wherein a molecular weight distribution (Mw/Mn) of the butadiene rubber is 1.5 to 5.0.

2. The winter tire according to claim 1, wherein an amount of carbon black in the rubber composition is 15 to 80 parts by mass per 100 parts by mass of the rubber component.

3. The winter tire according to claim 1, wherein the rubber component contains 80% by mass or less of the epoxidized natural rubber, based on 100% by mass of the rubber component.

4. The winter tire according to claim 1, wherein the amount of the oil in the rubber composition is 10 to 80 parts by mass per 100 parts by mass of the rubber component.

* * * * *